J. Humphreys,
Making Bayonets,

N°. 41,704.  Patented Feb. 23, 1864.

Witnesses:
Frederick Curtis
F. P. Hale Jr.

Inventor:
John Humphreys
by his attorney
R. H. Eddy

UNITED STATES PATENT OFFICE.

JOHN HUMPHREYS, OF MILLBURY, MASSACHUSETTS.

IMPROVEMENT IN TURNING BAYONET-SOCKETS.

Specification forming part of Letters Patent No. 41,704, dated February 23, 1864.

*To all whom it may concern:*

Be it known that I, JOHN HUMPHREYS, a resident of Millbury, in the county of Worcester and State of Massachusetts, have invented a new and useful Improvement in Machinery for Turning Bayonet-Sockets; and I do hereby declare the same to be fully described in the following specification and represented in the accompanying drawings, of which—

Figure 1:
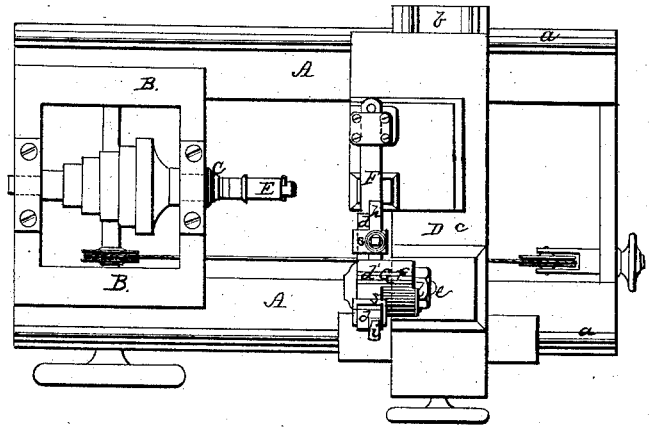
Figure 2:
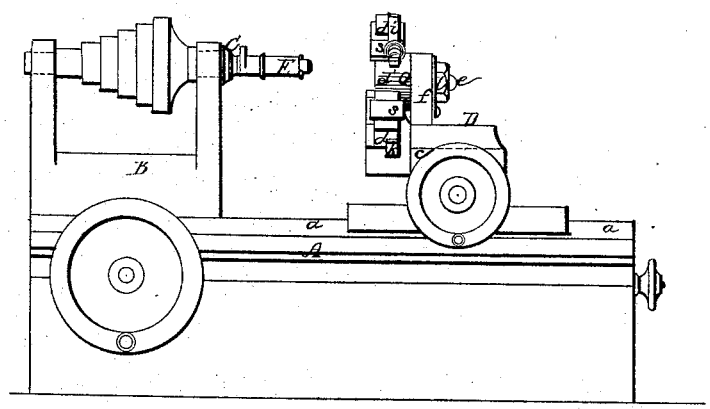
Figure 3:
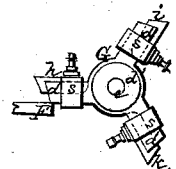
Figure 4:

Figure 1 denotes a top view, and Fig. 2 a front view, of a lathe provided with my invention. Fig. 3 is an inner side view of the rotary cutter head or stock, to be hereinafter explained. Fig. 4 is a side view of a bayonet-socket.

The nature of my invention consists in the combination of a rotary cutter-head and its slide-rest with the tool-carriage and mandrel of a turning-lathe.

In the drawings, A denotes the bed-frame, B the puppet-head, and C the mandrel, of a lathe as ordinarily constructed and arranged together. D is the tool-carriage, the lower part, b, of which rests on parallel ways a a, and should be provided with mechanism by which it may be moved or slid on such ways, and either toward or away from the puppet-head B. The upper part, c, of the tool-carriage rests on parallel guides applied to the lower part, b, and is also to be so supported thereon as to be capable of being moved horizontally and in a direction at right angles to the ways a a, and it should have mechanism by which such movements may be accomplished. In all these respects the tool-carriage and the operative mechanism, as mentioned, are substantially like similar parts in common use in slide lathes.

The mandrel is to be properly made to receive or center and support a bayonet-socket, which in the drawings is shown at E as duly encompassing and fixed on the mandrel or a portion thereof projecting beyond the puppet-head.

To the upper part, c, of the tool-carriage there are applied the slide-rest F and the rotary cutter-head or tool-carrier G. The said tool-carrier or rotary cutter-head consists of a series of arms, d d d, extending from a hub, d', in manner as shown in Fig. 3, the said hub being supported on a center pin or bolt, e, projecting from a vertical standard, f, raised on or making part of the upper portion of the cutter-carriage. The tool-carrier should be capable of being freely revolved on the pin e and have each of its arms provided with a clasp, s, or means of fastening to it a cutter or tool h, i, or k, these tools being properly shaped for producing the desired results—that is to say, one of them is to square down the "bridge" and the inside of the "bead" of the bayonet-socket, another is to give the requisite shape to the round part of the bead, and, finally, the third is to cut away the surplus part of the stock or reduce the socket cylindrically between the bridge and bead, and also beyond the latter. In order to use these tools, the rotary cutter-head or tool-carrier is to be intermittently rotated, so as to bring its tools in succession into proper positions to act on the bayonet-socket while the latter, with the mandrel, may be in revolution, the rotary cutter-head being stopped at the end of each movement by the slide-rest F, which is to be moved longitudinally so as to extend underneath that arm which carries the cutter which may be intended to next operate on the bayonet-socket. The said rest F consists of a slide-bar duly supported so as not only to be capable of being slid longitudinally toward and away from the cutter-head, but of holding the cutter-head stationary relatively to the said rest.

Figure 5:

A spring-latch, l, may be applied to the standard f, and to operate with a series of notches, n n n, arranged in the adjacent end of the hub d', as shown in Fig. 5.

Figure 6:
Figure 7:

Fig. 6 represents a longitudinal section of one of the said notches, Fig. 7 being a top view of the spring-latch. While the latch will prevent the rotary cutter-head from being rotated backward, it will permit it to be rotated forward, and will indicate when it may have reached each position for being arrested by the slide-rest.

By means of my said invention a bayonet-socket may be turned in much less time and with more precision than it can by means of tools used consecutively in a single tool-socket, which requires the removal from it of one tool before another can be put in its place and be suitably adjusted and fixed therein.

I claim as my invention—

The combination and arrangement of the rotary cutter head or stock G and the slide-rest F with the tool-carriage D and the mandrel C, the whole being to operate substantially in manner and for the purpose as specified.

JOHN HUMPHREYS.

Witnesses:
M. S. FELLOWS,
WM. H. GILBERT.